US009020818B2

(12) United States Patent
Zakarauskas et al.

(10) Patent No.: US 9,020,818 B2
(45) Date of Patent: Apr. 28, 2015

(54) FORMAT BASED SPEECH RECONSTRUCTION FROM NOISY SIGNALS

(75) Inventors: Pierre Zakarauskas, Vancouver (CA); Alexander Escott, Vancouver (CA); Clarence S. H. Chu, Vancouver (CA); Shawn E. Stevenson, Burnaby (CA)

(73) Assignee: Malaspina Labs (Barbados) Inc., Upton, St. Michael (BB)

( * ) Notice: Subject to any disclaimer, the term of this patent is extended or adjusted under 35 U.S.C. 154(b) by 415 days.

(21) Appl. No.: 13/589,977

(22) Filed: Aug. 20, 2012

(65) Prior Publication Data

US 2013/0231924 A1 Sep. 5, 2013

Related U.S. Application Data

(60) Provisional application No. 61/606,895, filed on Mar. 5, 2012.

(51) Int. Cl.

*G10L 15/00* (2013.01)
*G10L 15/14* (2006.01)
*G10L 15/26* (2006.01)
*G10L 21/00* (2013.01)
(Continued)

(52) U.S. Cl.

CPC ................. *G10L 21/02* (2013.01); *G10L 25/15* (2013.01); *G10L 25/75* (2013.01); *H04R 25/00* (2013.01)

(58) Field of Classification Search

CPC ..................... G10L 2015/08; G10L 2015/081; G10L 15/26; G10L 15/265; G10L 13/00; G10L 13/08; G10L 15/22; G10L 15/14; G10L 15/142; G10L 15/144

USPC .............. 704/243, 244, 246, 256, 256.7, 235, 704/236, 240, 255, 277

See application file for complete search history.

(56) References Cited

U.S. PATENT DOCUMENTS 3,989,896 A 11/1976 Reitboeck
5,706,395 A * 1/1998 Arslan et al. .................. 704/226

(Continued)

FOREIGN PATENT DOCUMENTS

WO 03096031 A2 11/2003

OTHER PUBLICATIONS

International Search Report for PCT/IB2013/000805 dated Dec. 12, 2013.

(Continued)

*Primary Examiner* — Edgar Guerra-Erazo

(57) ABSTRACT

Implementations of systems, method and devices described herein enable enhancing the intelligibility of a target voice signal included in a noisy audible signal received by a hearing aid device or the like. In particular, in some implementations, systems, methods and devices are operable to generate a machine readable formant based codebook. In some implementations, the method includes determining whether or not a candidate codebook tuple includes a sufficient amount of new information to warrant either adding the candidate codebook tuple to the codebook or using at least a portion of the candidate codebook tuple to update an existing codebook tuple. Additionally and/or alternatively, in some implementations systems, methods and devices are operable to reconstruct a target voice signal by detecting formants in an audible signal, using the detected formants to select codebook tuples, and using the formant information in the selected codebook tuples to reconstruct the target voice signal.

25 Claims, 9 Drawing Sheets

(51) Int. Cl.

| | |
|---|---|
| ***G10L 21/02*** | (2013.01) |
| ***H04R 25/00*** | (2006.01) |
| *G10L 25/15* | (2013.01) |
| *G10L 25/75* | (2013.01) |

(56) References Cited

U.S. PATENT DOCUMENTS

| | | | | |
|---|---|---|---|---|
| 6,104,992 | A | 8/2000 | Gao et al. | |
| 6,199,035 | B1 | 3/2001 | Lakaniemi et al. | |
| 6,611,800 | B1 | 8/2003 | Nishiguchi et al. | |
| 6,910,009 | B1 * | 6/2005 | Murashima | 704/225 |
| 6,978,235 | B1 | 12/2005 | Ozawa | |
| 7,643,994 | B2 | 1/2010 | Kemp | |
| RE43,191 | E * | 2/2012 | Arslan et al. | 704/226 |
| 2001/0021904 | A1 | 9/2001 | Plumpe | |
| 2002/0116182 | A1 * | 8/2002 | Gao et al. | 704/205 |
| 2004/0002856 | A1 * | 1/2004 | Bhaskar et al. | 704/219 |
| 2005/0149321 | A1 | 7/2005 | Kabi et al. | |
| 2008/0133225 | A1 | 6/2008 | Yamada | |
| 2009/0112579 | A1 * | 4/2009 | Li et al. | 704/205 |
| 2009/0240491 | A1 | 9/2009 | Reznik | |
| 2009/0287481 | A1 * | 11/2009 | Paranjpe et al. | 704/226 |
| 2010/0232616 | A1 | 9/2010 | Chamberlain et al. | |
| 2010/0262420 | A1 * | 10/2010 | Herre et al. | 704/201 |
| 2011/0044405 | A1 | 2/2011 | Sasaki et al. | |
| 2011/0081026 | A1 | 4/2011 | Ramakrishnan et al. | |
| 2012/0004909 | A1 | 1/2012 | Beltman et al. | |

OTHER PUBLICATIONS

International Search Report for PCT/IB2013/000802 dated Jan. 23, 2014.

International Search Report for PCT/IB2013/000888 dated May 15, 2014.

* cited by examiner

FORMAT BASED SPEECH RECONSTRUCTION FROM NOISY SIGNALS

RELATED APPLICATIONS

This application claims the benefit of U.S. Provisional Patent Application No. 61/606,895, entitled "Formant Based Speech Reconstruction from Noisy Signals," filed on Mar. 5, 2012, and which is incorporated by reference herein.

TECHNICAL FIELD

The present disclosure generally relates to enhancing speech intelligibility, and in particular, to formant based reconstruction of a speech signal from a noisy audible signal.

BACKGROUND

The ability to recognize and interpret the speech of another person is one of the most heavily relied upon functions provided by the human sense of hearing. Spoken communication typically occurs in adverse acoustic environments including ambient noise, interfering sounds, background chatter and competing voices. As such, the psychoacoustic isolation of a target voice from interference poses an obstacle to recognizing and interpreting the target voice. Multi-speaker situations are particularly challenging because voices generally have similar average characteristics. Nevertheless, recognizing and interpreting a target voice is a hearing task that unimpaired-hearing listeners are able to accomplish effectively, which allows unimpaired-hearing listeners to engage in spoken communication in highly adverse acoustic environments. In contrast, hearing-impaired listeners have more difficulty recognizing and interpreting a target voice even in low noise situations.

Previously available hearing aids utilize signal enhancement processes that improve sound quality in terms of the ease of listening (i.e., audibility) and listening comfort. However, the previously known signal enhancement processes do not substantially improve speech intelligibility beyond that provided by mere amplification of a noisy signal, especially in multi-speaker environments. One reason for this is that it is particularly difficult using the previously known processes to electronically isolate one voice signal from other voice signals because, as noted above, voices generally have similar average characteristics. Another reason is that the previously known processes that improve sound quality often degrade speech intelligibility, because, even those processes that aim to improve the signal-to-noise ratio, often end up distorting the target speech signal making it louder but harder to comprehend. In other words, previously available hearing aids exacerbate the difficulties hearing-impaired listeners have in recognizing and interpreting a target voice.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after considering the section entitled "Detailed Description" one will understand how the features of various implementations are used to enable enhancing the intelligibility of a target voice signal included in a noisy audible signal received by a hearing aid device or the like.

To that end, some implementations include systems, methods and/or devices operable to generate a machine readable formant based codebook. In some implementations, the formant based codebook includes a number of codebook tuples, and each codebook tuple includes a formant spectrum value and one or more formant amplitude values. In some implementations, the formant spectrum value is indicative of the spectral location of each of the one or more formants characterizing a particular codebook tuple. Similarly, in some implementations, the one or more formant amplitude values are indicative of the corresponding amplitudes or acceptable amplitude ranges of the one or more formants characterizing a particular codebook tuple. In some implementations, the formant based codebook is generated using a plurality of human voice samples that are generally characterized by one or more intelligibility values that are representative of average to highly intelligible speech. In some implementations, the method includes generating a candidate codebook tuple using a voice sample and determining whether or not the candidate codebook tuple includes a sufficient amount of new information to warrant either adding the candidate codebook tuple to the codebook or using at least a portion of the candidate codebook tuple to update an existing codebook tuple.

Additionally and/or alternatively, some implementations include systems, methods and devices operable to reconstruct a target voice signal using associated formants detected in a received audible signal, the formant based codebook, and a pitch estimate. In some implementations, the method includes detecting formants in an audible signal, using the detected formants to select one or more codebook tuples in the codebook, and using the formant information in the selected codebook tuples, not the detected formants, to reconstruct the target voice signal in combination with the pitch estimate. In some implementations, in order to improve the sound quality of the reconstructed target voice signal the reconstructed target voice signal is resynthesized one glottal pulse at a time through an Inverse Fast Fourier Transform (IFFT) of the interpolated spectrum centered on each glottal pulse, while adjusting the phase between sequential glottal pulses so that the phase remains with an acceptable range.

Some implementations include a method of generating a machine readable formant based codebook from a plurality of voice samples. In some implementations, the method includes detecting one or more formants in a voice sample, wherein each formant is characterized by a respective spectral location and a respective amplitude value; generating a candidate codebook tuple for the voice sample, wherein the candidate codebook tuple includes a formant spectrum value and one or more formant amplitude values, wherein the formant spectrum value is indicative of the spectral location of each of the one or more detected formants, and the one or more formant amplitude values are indicative of the corresponding amplitudes of the one or more detected formants; and selectively adding at least a portion of the candidate codebook tuple to the codebook based at least on whether any portion of the candidate codebook tuple matches a corresponding portion of an existing codebook tuple.

Some implementations include a formant based codebook generation device operable to generate a formant based codebook. In some implementations, the device includes a formant detection module configured to detect one or more formants in a voice sample, wherein each formant is characterized by a respective spectral location and a respective amplitude value; a tuple generation module configured to generate a candidate codebook tuple for the voice sample, wherein the candidate codebook tuple includes a formant spectrum value and one or more formant amplitude values, wherein the formant spectrum value is indicative of the spectral location of each of the one or more detected formants, and the one or more formant amplitude values are indicative of the corresponding amplitudes of the one or more detected formants; and a tuple evaluation module configured to selective add at least a portion of the candidate codebook tuple to the codebook based at least on whether any portion of the candidate codebook tuple matches a corresponding portion of an existing codebook tuple.

Additionally and/or alternatively, in some implementations, the device includes means for detecting one or more formants in a voice sample, wherein each formant is characterized by a respective spectral location and a respective amplitude value; means for generating a candidate codebook tuple for the voice sample, wherein the candidate codebook tuple includes a formant spectrum value and one or more formant amplitude values, wherein the formant spectrum value is indicative of the spectral location of each of the one or more detected formants, and the one or more formant amplitude values are indicative of the corresponding amplitudes of the one or more detected formants; and means for selectively adding at least a portion of the candidate codebook tuple to the codebook based at least on whether any portion of the candidate codebook tuple matches a corresponding portion of an existing codebook tuple.

Additionally and/or alternatively, in some implementations, the device includes a processor and a memory including instructions. When executed, the instructions cause the processor to detect one or more formants in a voice sample, wherein each formant is characterized by a respective spectral location and a respective amplitude value; generate a candidate codebook tuple for the voice sample, wherein the candidate codebook tuple includes a formant spectrum value and one or more formant amplitude values, wherein the formant spectrum value is indicative of the spectral location of each of the one or more detected formants, and the one or more formant amplitude values are indicative of the corresponding amplitudes of the one or more detected formants; and selectively add at least a portion of the candidate codebook tuple to the codebook based at least on whether any portion of the candidate codebook tuple matches a corresponding portion of an existing codebook tuple.

Some implementations include a method of reconstructing a speech signal from an audible signal using a formant-based codebook. In some implementations, the method includes detecting one or more formants in an audible signal; receiving a pitch estimate associated with the one or more detected formants; selecting one or more codebook tuples from the formant-based codebook based at least on the one or more detected formants, wherein each codebook tuple includes a respective formant spectrum value and a respective one or more formant amplitude values, wherein the respective formant spectrum value is indicative of the spectral location of one or more formants associated with the codebook tuple, and the respective one or more formant amplitude values are indicative of the corresponding amplitudes of the one or more formants associated with the codebook tuple; and, interpolating the spectrum between the corresponding one or more formants associated with the one or more selected codebook tuples to generate a reconstructed speech signal using the received pitch estimate.

Some implementations include a voice reconstruction device operable to reconstruct a speech signal from an audible signal using a formant based codebook. In some implementations, the device includes a formant detection module configured to detect one or more formants in an audible signal; a tuple selection module configured to select one or more codebook tuples from the formant-based codebook based at least on the one or more detected formants, wherein each codebook tuple includes a respective formant spectrum value and a respective one or more formant amplitude values, wherein the respective formant spectrum value is indicative of the spectral location of one or more formants associated with the codebook tuple, and the respective one or more formant amplitude values are indicative of the corresponding amplitudes of the one or more formants associated with the codebook tuple; and a synthesis module configured to interpolate the spectrum between the corresponding one or more formants associated with the one or more selected codebook tuples to generate a reconstructed speech signal using a pitch estimate.

Additionally and/or alternatively, in some implementations, the device includes means for detecting one or more formants in an audible signal; means for selecting one or more codebook tuples from the formant-based codebook based at least on the one or more detected formants, wherein each codebook tuple includes a respective formant spectrum value and a respective one or more formant amplitude values, wherein the respective formant spectrum value is indicative of the spectral location of one or more formants associated with the codebook tuple, and the respective one or more formant amplitude values are indicative of the corresponding amplitudes of the one or more formants associated with the codebook tuple; and means for interpolating the spectrum between the corresponding one or more formants associated with the one or more selected codebook tuples to generate a reconstructed speech signal using a pitch estimate.

Additionally and/or alternatively, in some implementations, the device includes a processor and a memory including instructions. When executed, the instructions cause the processor to detect one or more formants in an audible signal; select one or more codebook tuples from the formant-based codebook based at least on the one or more detected formants, wherein each codebook tuple includes a respective formant spectrum value and a respective one or more formant amplitude values, wherein the respective formant spectrum value is indicative of the spectral location of one or more formants associated with the codebook tuple, and the respective one or more formant amplitude values are indicative of the corresponding amplitudes of the one or more formants associated with the codebook tuple; and interpolate the spectrum between the corresponding one or more formants associated with the one or more selected codebook tuples to generate a reconstructed speech signal using a pitch estimate.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, illustrate only some example features of the present disclosure and are therefore not to be considered limiting, for the description may admit to other effective features.

Figure 1:
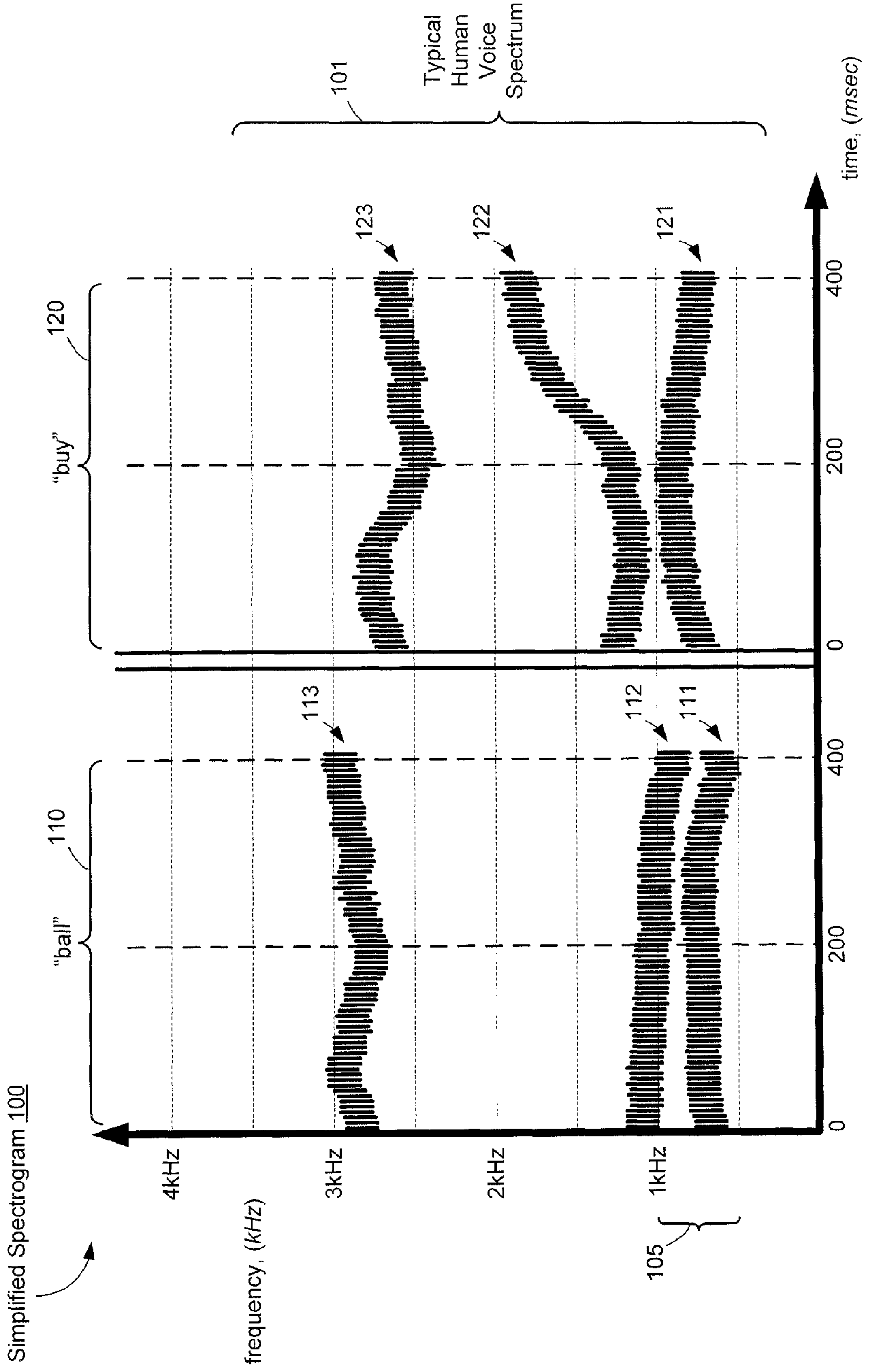
FIG. 1 is a simplified spectrogram showing example formants of two words.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein enable enhancing the intelligibility of a target voice signal included in a noisy audible signal received by a hearing aid device or the like. In particular, in some implementations, systems, methods and devices are operable to generate a machine readable formant based codebook. For example, in some implementations, a method includes generating a candidate codebook tuple from a voice sample and then determining whether or not the candidate codebook tuple includes a sufficient amount of new information to warrant either adding the candidate codebook tuple to the codebook or using at least a portion of the candidate codebook tuple to update an existing codebook tuple in the codebook. Additionally and/or alternatively, in some implementations systems, methods and devices are operable to reconstruct a target voice signal by detecting formants in an audible signal, using the detected formants to select codebook tuples, and using the formant information in the selected codebook tuples to reconstruct the target voice signal in combination with a pitch estimate.

Numerous details are described herein in order to provide a thorough understanding of the example implementations illustrated in the accompanying drawings. However, the invention may be practiced without these specific details. And, well-known methods, procedures, components, and circuits have not been described in exhaustive detail so as not to unnecessarily obscure more pertinent aspects of the example implementations.

The general approach of the various implementations described herein is to enable resynthesis or reconstruction of a target voice signal from a formant based voice model stored in a codebook. In some implementations, this approach may enable substantial isolation of a target voice included in a received audible signal from various types of interference included in the same audible signal. In turn, in some implementations, this approach may substantially reduce the impact of various noise sources without substantial attendant distortion and/or reductions of speech intelligibility common to previously known methods.

Formants are the distinguishing frequency components of voiced sounds that make up intelligible speech. Various implementations utilize a formant based voice model because formants have a number of desirable attributes. First, formants allow for a sparse representation of speech, which in turn, reduces the amount of memory and processing power needed in a device such as a hearing aid. For example, some implementations aim to reproduce natural speech with eight or fewer formants. On the other hand, other known model-based voice enhancement methods tend to require relatively large allocations of memory and tend to be computationally expensive.

Second, formants change slowly with time, which means that a formant based voice model programmed into a hearing aid will not have to be updated very often, if at all, during the life of the device.

Third, the majority of human beings naturally produce the same set of formants when speaking, and these formants do not change substantially is response to changes or differences in pitch between speakers or even the same speaker. Additionally, unlike phonemes, formants are language independent. As such, in some implementations a single formant based voice model, generated in accordance the prominent features discussed below, can be used to reconstruct a target voice signal from almost any speaker without extensive fitting of the model to each particular speaker a user encounters.

Fourth, formants are robust in the presence of noise and other interference. In other words, formants remain distinguishable even in the presence of high levels of noise and other interference. In turn, as discussed in greater detail below, in some implementations formants detected in a noisy signal are used to reconstruct a low noise voice signal from the formant based voice model. The distortion experienced using known digital noise reduction techniques does not occur because no effort is made to reduce noise in the noisy audible signal (i.e., improve the signal-to-noise ratio). Rather, the detected characteristics of the voice signal are used to reconstruct the voice signal from formant based voice model.

Additionally and/or alternatively, various implementations of systems, methods and devices described herein are operable to isolate a target voice in a noise audible signal by grouping together formants for the target voice by detecting the synchronization in time between formants that are excited by the same train of one or more glottal pulses. To that end, it is useful to review how voiced sounds are created in the vocal track of human beings. Air pressure from the lungs is buffeted by the glottis, which periodically opens and closes. The resulting pulses of air excite the vocal track, throat, mouth and sinuses which act as resonators, so that the resulting voiced sound has the same periodicity as the train of glottal pulses. By moving the tongue and vocal chords the spectrum of the voiced sound is changed to produce speech, however, the aforementioned periodicity remains.

The duration of one glottal pulse is representative of the duration one opening and closing cycle of the glottis, and the fundamental frequency of the glottal pulse train is the inverse of the duration of a single glottal pulse. The fundamental frequency of a glottal pulse train dominates the perception of the pitch of a voice (i.e., how high or low a voice sounds). For example, a bass voice has a lower fundamental frequency than a soprano voice. A typical adult male will have a fundamental frequency of from 85 to 155 Hz, and that of a typical adult female from 165 to 255 Hz. Children and babies have even higher fundamental frequencies. Infants show a range of 250 to 650 Hz, and in some cases go over 1000 Hz.

During speech, it is natural for the fundamental frequency to vary within a range of frequencies. Changes in the fundamental frequency are heard as the intonation pattern or melody of natural speech. Since a typical human voice varies over a range of fundamental frequencies, it is more accurate to speak of a person having a range of fundamental frequencies, rather than one specific fundamental frequency. Nevertheless, a relaxed voice is typically characterized by a “natural” fundamental frequency or pitch that is comfortable for that person.

In some implementations, the problem of isolating a target voice from interfering sounds is accomplished by identifying the formant peaks of the target voice in the noisy audible signal, since the particular language-specific phoneme being conveyed includes a combination of the formants peaks. This, in turn, leads to the frequently occurring challenge of isolating the formant peaks of the target speaker from other speakers in the same noisy audible signal. As noted above, multi-speaker situations are particularly challenging because competing voices have similar average characteristics. As an example, multi-speaker situations include situations in which the voice of a target speaker is being obscured by background chatter (e.g., the cocktail party problem). As another example, multi-speaker situations include situations in which the voice of the target speaker is one of many competing voices (e.g., the family dinner problem).

In some implementations systems, methods and devices are operable to separate detected formants into disjoint sets attributable to different speakers by identifying correlated responses to a common excitation. Although the correlations are typically very brief, it is possible to use the correlations to separate voice signals from one another by imposing weak continuity constraints on the detected formants to match the correlations across longer portions of speech.

To that end, in some implementations, a target voice signal is isolated from multi-speaker interference by detecting time synchronization between formants peaks in the target voice signal and rejecting formant peaks that are not time synchronized. In other words, detected formants peaks are grouped based at least on synchronization with the glottal pulse train of the target speaker, which can be gleaned from an estimate of the pitch. Additionally and/or alternatively, detected formants peaks may also be grouped based on the relative amplitude of the formant peaks. In some implementations, the default target voice signal that is enhanced is the louder of two or more competing voice signals. Consequently, signal enhancement performance in the presence of background chatter may be better than signal enhancement performance when two competing speakers have relatively similar voice amplitudes as received by a hearing aid or the like. Additionally and/or alternatively, another cue to the grouping of formants is common onsets and offsets of formants belonging to the same speaker.

FIG. 1 is a simplified spectrogram 100 showing example formant sets 110, 120 associated with two words, namely, "ball" and "buy", respectively. Those skilled in the art will appreciate that the simplified spectrogram 100 includes merely the basic information typically available in a spectrogram. So while certain specific features are illustrated, those skilled in the art will appreciate from the present disclosure that various other features have not been illustrated for the sake of brevity and so as not to obscure more pertinent aspects of the spectrogram 100 as they are used to describe more prominent features of the various implementations disclosed herein. The spectrogram 100 does not include much of the more subtle information one skilled in the art would expect in a far less simplified spectrogram. Nevertheless, those skilled in the art would appreciate that the spectrogram 100 does include enough information to illustrate the differences between the two sets of formants 110, 120 for the two words. For example, as discussed in greater detail below, the spectrogram 100 includes representations of the three dominant formants for each word.

The spectrogram 100 includes the typical portion of the frequency spectrum associated with the human voice, the human voice spectrum 101. The human voice spectrum typically ranges from approximately 300 Hz to 3400 Hz. However, the bandwidth associated with a typical voice channel is approximately 4000 Hz (4 kHz) for telephone applications and 8000 Hz (8 kHz) for hear aid applications, which are bandwidths that are more conducive to signal processing techniques known in the art.

As noted above, formants are the distinguishing frequency components of voiced sounds that make up intelligible speech. Each phoneme in any language contains some combination of the formants in the human voice spectrum 101. In some implementations, detection of formants and signal processing is facilitated by dividing the human voice spectrum 101 into multiple sub-bands. For example, sub-band 105 has an approximate bandwidth of 500 Hz. In some implementations, eight such sub-bands are defined between 0 Hz and 4 kHz. However, those skilled in the art will appreciate that any number of sub-bands with varying bandwidths may be used for a particular implementation.

In addition to characteristics such as pitch and amplitude (i.e., loudness), the formants and how they vary in time characterize how words sound. Formants do not vary significantly in response to changes in pitch. However, formants do vary substantially in response to different vowel sounds. This variation can be seen with reference to the formant sets 110, 120 for the words "ball" and "buy." The first formant set 110 for the word "ball" includes three dominant formants 111, 112 and 113. Similarly, the second formant set 120 for the word "buy" also includes three dominant formants 121, 122 and 123. The three dominant formants 111, 112 and 113 associated with the word "ball" are both spaced differently and vary differently in time as compared to the three dominant formants 121, 122 and 123 associated with the word "buy." Moreover, if the formant sets 110 and 120 are attributable to different speakers, the formants sets would not be synchronized to the same fundamental frequency defining the pitch of one of the speakers.

Figure 2:
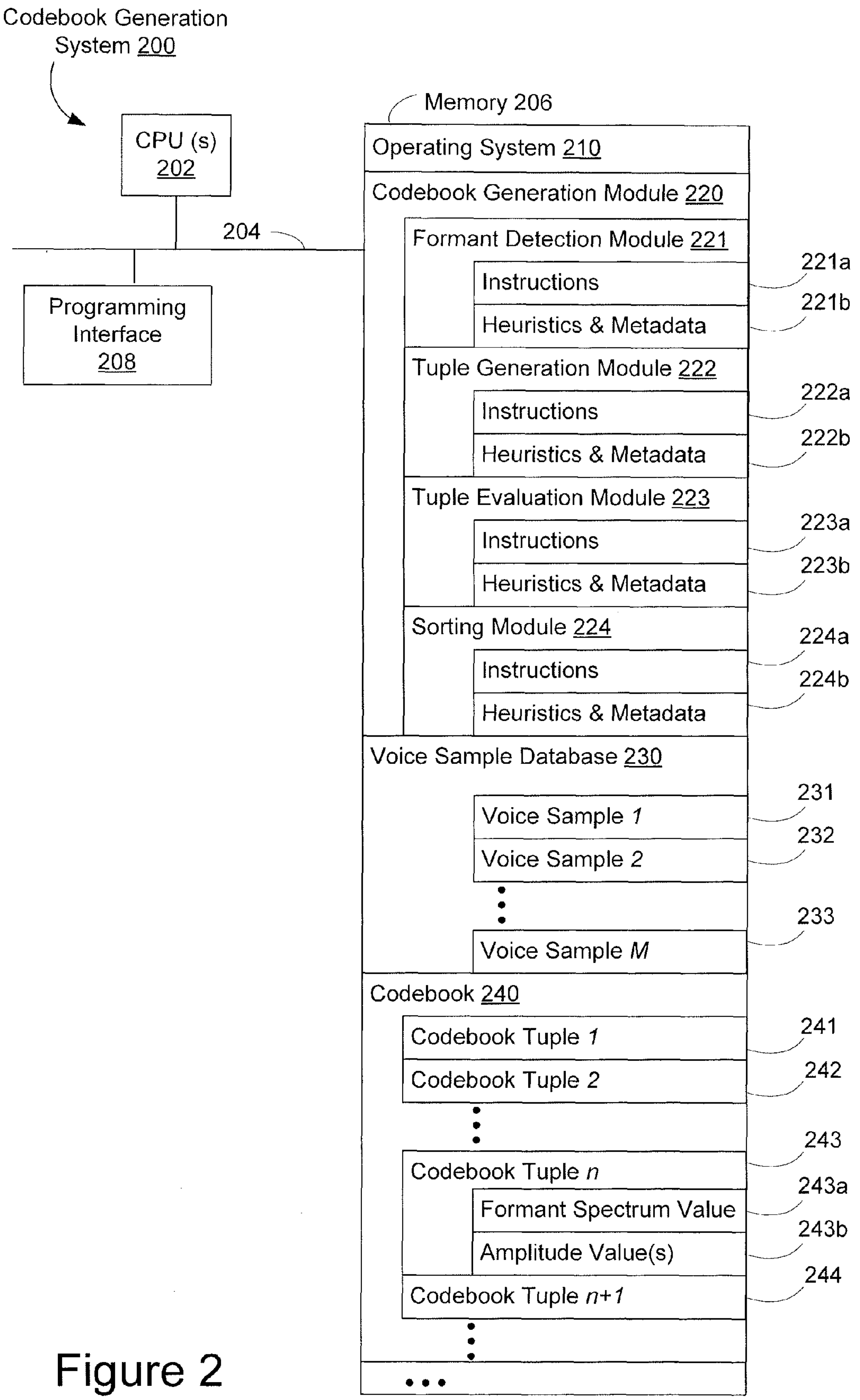
FIG. 2 is a block diagram of an example implementation of a codebook generation system.

FIG. 2 is a block diagram of an example implementation of a codebook generation system 200. While certain specific features are illustrated, those skilled in the art will appreciate from the present disclosure that various other features have not been illustrated for the sake of brevity and so as not to obscure more pertinent aspects of the example implementations disclosed herein. To that end, as a non-limiting example, in some implementations the codebook generation system 200 includes one or more processing units (CPU's) 202, one or more programming interfaces 208, a memory 206, and one or more communication buses 204 for interconnecting these and various other components.

The communication buses 204 may include circuitry (sometimes called a chipset) that interconnects and controls communications between system components. The memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, including the non-volatile and volatile memory device(s) within the memory 206, comprises a non-transitory computer readable storage medium. In some implementations, the memory 206 or the non-transitory computer readable storage medium of the memory 206 stores the following programs, modules and data structures, or a subset thereof including an optional operating system 210, a codebook generation module 220, a voice sample database 230, and a formant based codebook 240.

The operating system 210 includes procedures for handling various basic system services and for performing hardware dependent tasks.

In some implementations, the voice sample database 230 stores human voice samples that are used to generate the codebook. For example, voices samples 231, 232 and 233 representing voice samples 1, 2, . . . , M, are schematically illustrated in FIG. 2. In some implementations, the voice samples include audible frequencies that are within the spectrum typically associated with human speech. In some implementations, the voice samples each include a single voice signal of one respective speaker. In some implementations, while each voice sample includes a single voice signal, different voice samples are associated with different speakers so that the codebook can be trained on a varied collection of data. In some implementations, the voice samples also include pitch frequencies higher or lower than typically associated with human speech. For example, the voice samples may include samples of singing, yodeling or the like. In some implementations, the voice samples may include at least some voice samples that are each characterized by an intelligibility value representative of average-to-highly intelligible speech. For example, the respective intelligibility values may be each characterized by a speech transmission index value greater than 0.45. However, those skilled in the art will appreciate that other intelligibility scales may be used to characterize one or more of the voice samples. For example, values indicative of articulation loss, clarity index and other units of measurement may be used.

Similarly, in some implementations, the formant based codebook 240 stores codebook tuples that have been generated by the codebook generation module 210 and/or received from another source. For example, schematic representations of codebook tuples 241, 242, 243 and 244 are included in FIG. 2 within the formant based codebook 240.

In some implementations, as shown for example with reference to codebook tuple 243, each codebook tuple includes a formant spectrum 243*a* value and one or more formant amplitude values 243*b*. In some implementations, the formant spectrum value is indicative of the spectral location of each of the one or more formants characterizing a particular codebook tuple. Similarly, in some implementations, the one or more formant amplitude values are indicative of the corresponding amplitudes or acceptable amplitude ranges of the one or more formants characterizing a particular codebook tuple. In some implementations, the spectrum associated with human speech characterized by a number of sub-bands, and a particular formant spectrum value indicates which of the sub-bands includes the one or more formants for a respective codebook tuple. In some implementations, the formant spectrum value includes a binary pattern representing the aforementioned sub-band information. In some implementation, the formant spectrum value includes an encoded value representing the same.

In some implementations, the codebook generation module 220 includes a formant detection module 221, a tuple generation module 222, a tuple evaluation module 223, and a sorting module 224. In some implementations, the codebook generation module 220 generates a candidate codebook tuple using a voice sample and determines whether or not the candidate codebook tuple includes a sufficient amount of new information to warrant either adding the candidate codebook tuple to the codebook or using at least a portion of the candidate codebook tuple to update an existing codebook tuple.

To that end, in some implementations the formant detection module 221 is configured to detect formants within a voice sample and provide an output indicative of where in the spectrum the detected formants are located, along with the amplitude for each detected formant. In some implementations, the voice samples are received as time series representations of voice or recordings. As such, in some implementations, the formant detection module 221 is also configured to convert a voice sample into a number of time-frequency units, such that the time dimension of each time-frequency unit includes at least one of a plurality of sequential intervals, and wherein the frequency dimension of each time-frequency unit includes at least one of a plurality of sub-bands contiguously distributed throughout the frequency spectrum associated with human speech. The conversion may be accomplished using a Fast Fourier Transform (FFT) centered on each sub-band. In order to accomplish these ends, in some implementations, the formant detection module 221 includes a set of instructions 221*a* and heuristics and metadata 221*b*.

In some implementations, the tuple generation module 222 is configured to generate a candidate codebook tuple from the outputs received from the formant detection module 221. In some implementations, a candidate codebook tuple has the same or similar structure to that of the existing codebook tuples. That is, a candidate codebook tuple may include a formant spectrum value and one or more formant amplitude values, wherein the formant spectrum value is indicative of the spectral location of each of the one or more detected formants, and the one or more formant amplitude values are indicative of the corresponding amplitudes of the one or more detected formants. In order to accomplish these ends, in some implementations, the tuple generation module 222 includes a set of instructions 222*a* and heuristics and metadata 222*b*.

In some implementations, the tuple evaluation module 223 is configured to determine whether or not a candidate codebook tuple generated by the tuple generation module 222 includes a sufficient amount of new information to warrant either adding the candidate codebook tuple to the codebook or using at least a portion of the candidate codebook tuple to update an existing codebook tuple. To that end, in some implementations, the tuple evaluation module 223 includes a set of instructions 223*a* and heuristics and metadata 223*b*. Implementations of the processes involved with evaluating a candidate tuple are discussed in greater detail below with reference to FIGS. 4 and 5.

In some implementations, the sorting module 224 is configured to sort the codebook 240 once all and/or a representative number of the voice samples have been considered by the codebook generation module 220. For example, the codebook tuples included in the codebook 240 may be sorted at least based on frequency of occurrence with respect to the voice samples, a weighting factor and/or groupings tuples having similar formants. To that end, in some implementations, the sorting module 223 includes a set of instructions 224*a* and heuristics and metadata 224*b*.

Moreover, FIG. 2 is intended more as functional description of the various features which may be present in a particular implementation as opposed to a structural schematic of the implementations described herein. In practice, and as recognized by those of ordinary skill in the art, items shown separately could be combined and some items could be separated. For example, some modules (e.g., formant detection module 221 and the tuple generation module 222) shown separately in FIG. 2 could be implemented in a single module and the various functions of single modules could be implemented by one or more modules in various implementations. The actual number of modules and the division of particular functions used to implement the codebook generation module 200 and how features are allocated among them will vary from one implementation to another, and may depend in part on the particular combination of hardware, software and/or firmware chosen for a particular implementation.

Figure 3:
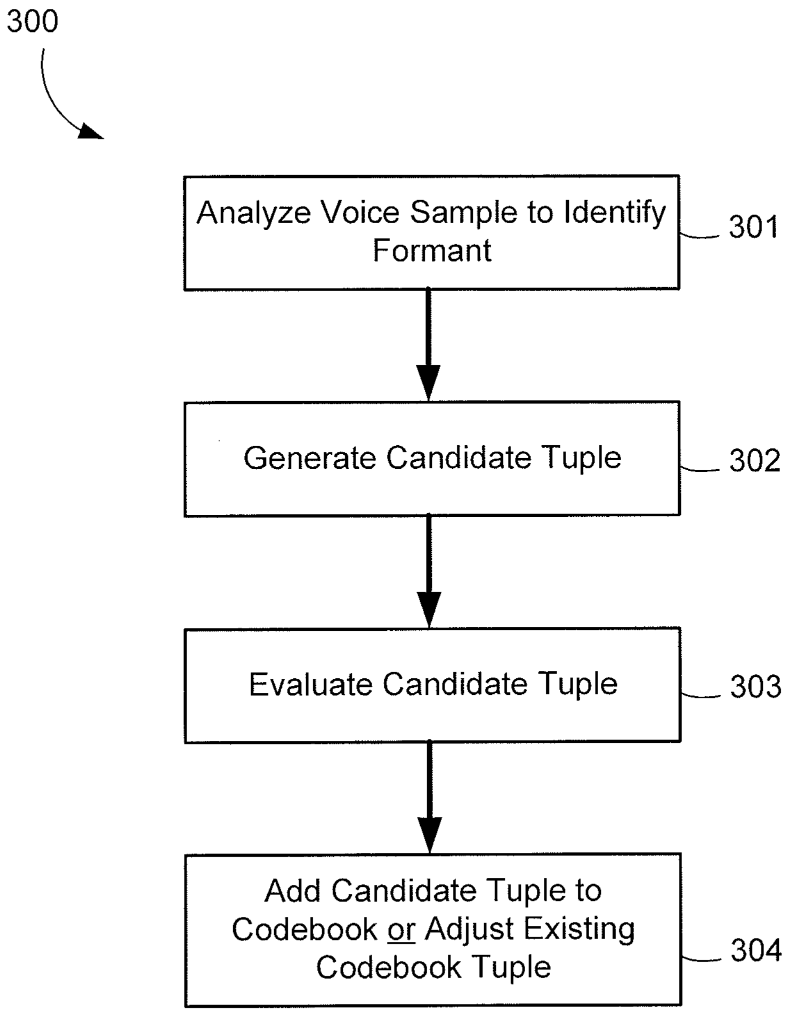
FIG. 3 is a flowchart representation of an implementation of a codebook generation system method.

FIG. 3 is a flowchart 300 representing an implementation of a codebook generation system method. In some implementations, the method is performed by a codebook generation system in order to produce codebook tuples for a formant based codebook. Briefly, the method analyzes a voice sample to generate a candidate codebook tuple, which is evaluated to determine whether or not the candidate codebook tuple includes a sufficient amount of new information to warrant either adding the candidate codebook tuple to the codebook or using at least a portion of the candidate codebook tuple to update an existing codebook tuple.

To that end, the method includes analyzing a voice sample (301). In some implementations, analysis of a voice sample includes detecting and characterizing the formants included in a voice sample. To that end, detected formants are characterized by an amplitude (or energy level) and where in the spectrum the detected formants are located. In some implementations the detected formants may be further characterized by at least one of a corresponding center frequency, a frequency offset and a bandwidth. Voice samples may be received as time series representations of voice or recordings. As such, in some implementations, the analysis includes converting a voice sample into a number of time-frequency units, such that the time dimension of each time-frequency unit includes at least one of a plurality of sequential intervals, and the frequency dimension of each time-frequency unit includes at least one of a plurality of sub-bands contiguously distributed throughout the frequency spectrum associated with human speech.

The method then includes generating a candidate codebook tuple using the characterizations of the detected formants (302). As noted above, in some implementations, candidate codebook tuples may have the same or similar structure to that of existing codebook tuples in order to facilitate comparisons between a candidate codebook tuple and the existing codebook tuples. The method includes evaluating the generated candidate codebook tuple at least with respect to the existing codebook tuples (303). A more detailed example of an implementation of an evaluation process is described below with reference to the flowchart illustrated in FIG. 5. The method includes adding the candidate codebook tuple to the codebook or using at least a portion of the candidate codebook tuple to update an existing codebook tuple based at least on the evaluation of the candidate codebook tuple (304).

Figure 4:
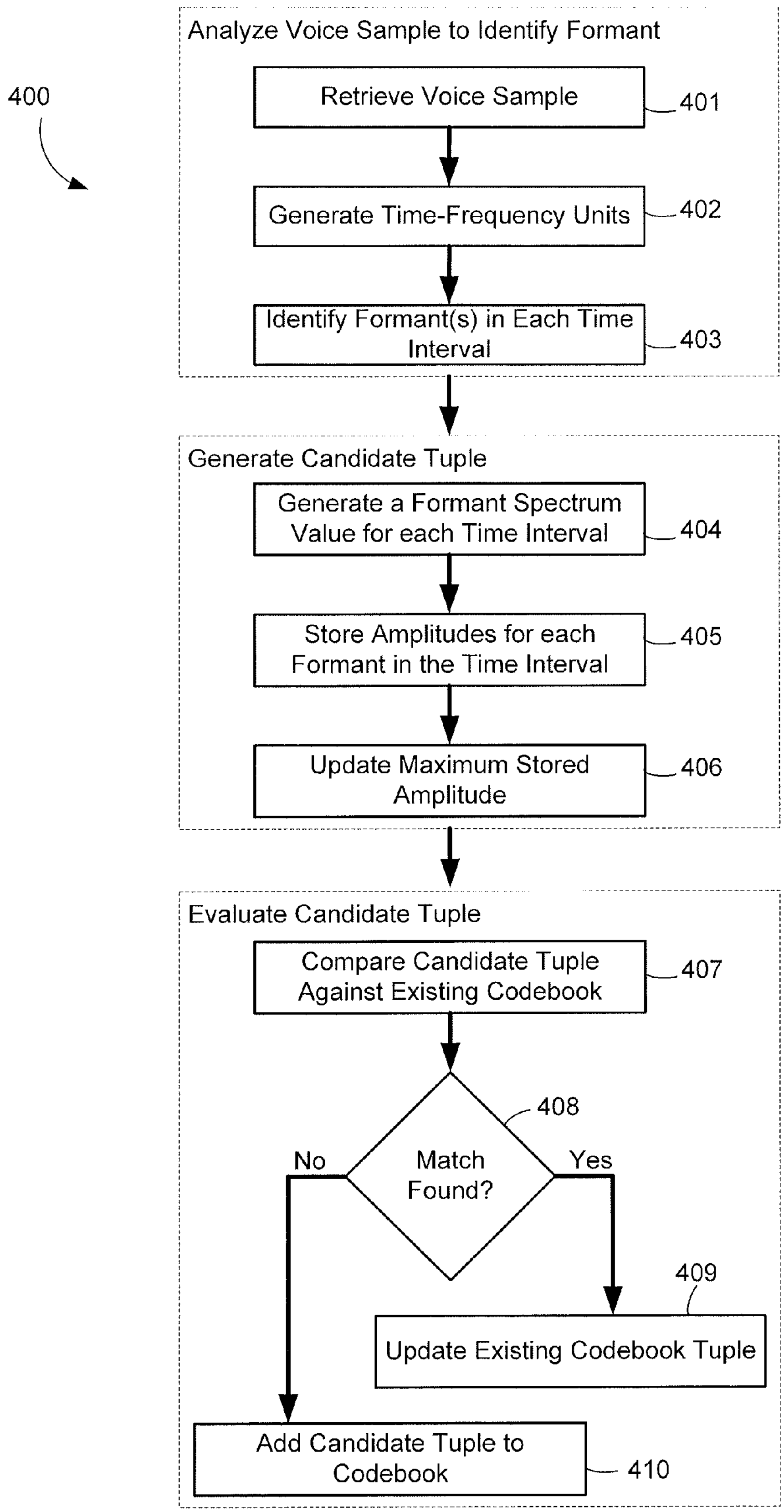
FIG. 4 is a flowchart representation of an implementation of a codebook generation system method.

FIG. 4 is a flowchart 400 representing an implementation of a codebook generation system method. In some implementations, the method is performed by a codebook generation system in order to produce codebook tuples for a formant based codebook. Briefly, the method analyzes a voice sample to generate a candidate codebook tuple, which is evaluated to determine whether to not the candidate codebook tuple includes a sufficient amount of new information to warrant either adding the candidate codebook tuple to the codebook or using at least a portion of the candidate codebook tuple to update an existing codebook tuple.

The method includes retrieving a voice sample, such as a voice recording, from a storage medium (401). Using the retrieved voice sample, the method includes generating a number of time-frequency units from the voice sample (402). In some implementations, the time dimension of each time-frequency unit includes at least one of a plurality of sequential intervals, and the frequency dimension of each time-frequency unit includes at least one of a plurality of sub-bands contiguously distributed throughout the frequency spectrum associated with human speech. For example, with further reference to FIG. 1, in the frequency domain, the 4 kHz band including the human voice spectrum 101 may be divided into a number of 500 Hz sub-bands, as shown for example by sub-band 105. In the time domain, each interval may be 40 milliseconds in one implementation, and 10 milliseconds in another implementation. While specific examples are highlighted above, for both the time and frequency dimensions of the time-frequency units, those skilled in the art will appreciate that the sub-bands in the frequency domain and the intervals in the time domain can be defined using any number of specific values and combinations of those values. As such, the specific examples discussed above are not meant to be limiting.

Returning to FIG. 4, the method includes analyzing the time-frequency units to identify formants in each time interval (403). To that end, detected formants are characterized by an amplitude (or energy level) and where in the spectrum the detected formants are located. In some implementations the detected formants may be further characterized by at least one of a corresponding center frequency, a frequency offset and a bandwidth. Using the frequency characteristics of the detected formants, the method includes generating a formant spectrum value for each time interval, which is included in the candidate codebook tuple for that time interval (404). As such, in some implementations, one or more candidate codebook tuples are generated for each voice sample in response to dividing the duration of the voice sample into more than one interval.

In some implementations, the formant spectrum value includes a binary pattern representing the aforementioned sub-band information. In other words, one formant spectrum value is used to represent the presence of multiple formants in multiple corresponding sub-bands. Additionally and/or alternatively, in some implementations, more than one formant spectrum value is generated for each candidate codebook tuple, such that each formant spectrum value is indicated of one or more of the detected formants for that interval. Additionally and/or alternatively, a formant spectrum value includes an encoded value representing the aforementioned sub-band information. The encode value may be a hash value generated by combining the frequency domain characterizations of the detected formants.

Along with the formant spectrum value, the method includes storing and/or including the respective amplitudes of the detected formants in the candidate codebook tuple (405). Additionally, the method includes updating the maximum stored amplitude using the amplitude characteristics of detected formants for a particular speaker, so that the detected formants associated with that particular speaker can be normalized with respect to the maximum amplitude detected from the voice samples associated with that particular speaker.

The method includes comparing the candidate codebook tuple against the existing codebook tuples (407). As noted above, a more detailed example of an implementation of an evaluation process is described below with reference to the flowchart illustrated in FIG. 5. Based on the evaluation, the method includes determining whether a match between the candidate codebook tuple and an existing codebook tuple was identified (408). If a match was found ("Yes" path from 408), the method includes updating the existing codebook tuple (409). For example, updating an existing codebook tuple may include: updating a weighting factor representative of how many voice samples matched the codebook tuple; adjusting an amplitude range associated with the formants associated with the codebook tuple in order to take into account variations added by the candidate codebook tuple; re-normalizing the amplitude values associated with the formants associated with the codebook tuple in order to take into account variations added by the candidate codebook tuple, etc. On the other hand, if no match was found ("No" path from 408), the method includes adding the candidate codebook tuple to the codebook because it is considered new with respect to the existing codebook tuples (410).

Figure 5:
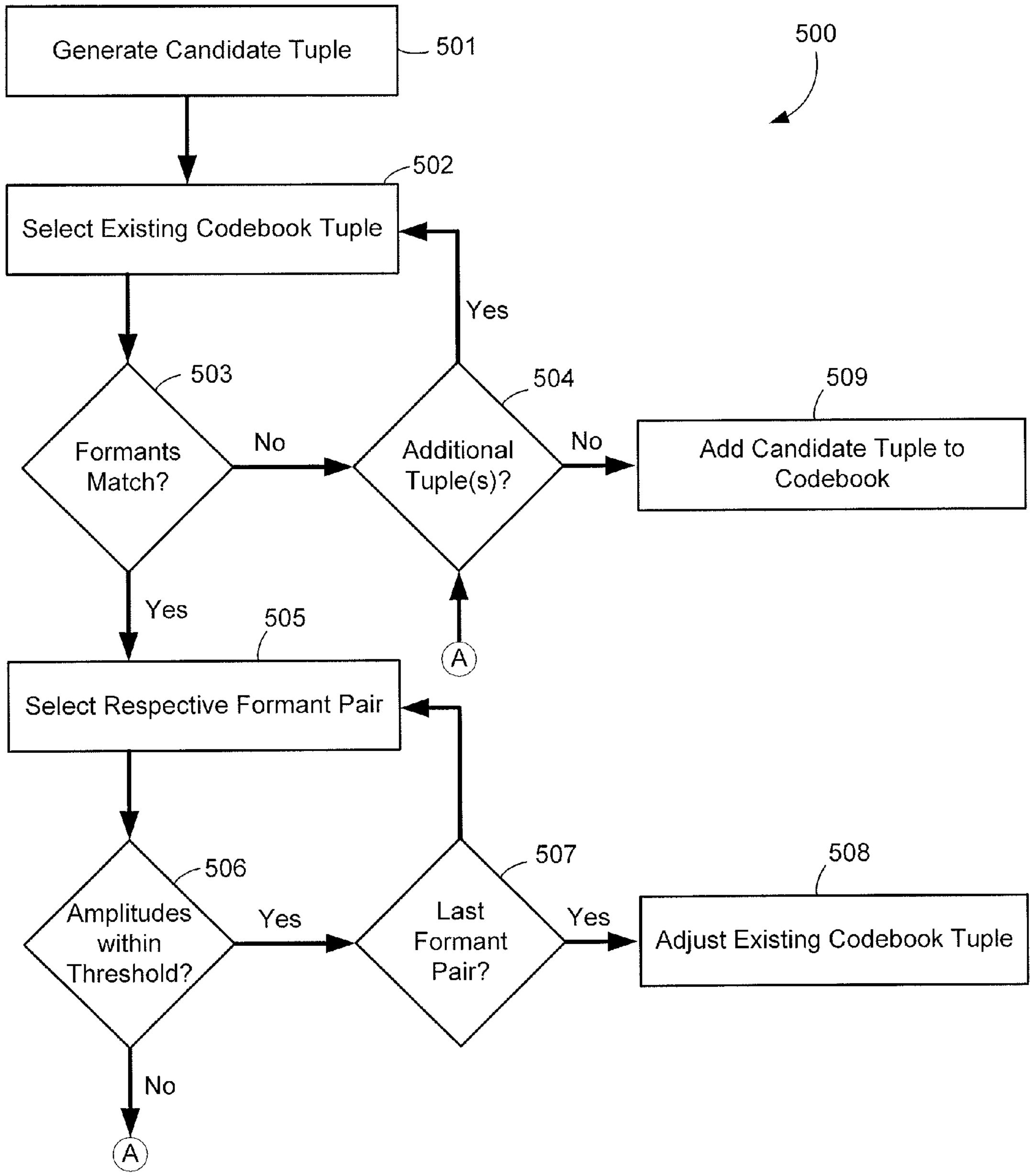
FIG. 5 is a flowchart representation of an implementation of a codebook generation system method.

FIG. 5 is a flowchart 500 representing of an implementation of a codebook generation system method. In some implementations, the method is performed by a codebook generation system in order to determine whether to not the candidate codebook tuple includes a sufficient amount of new information to warrant either adding the candidate codebook tuple to the codebook or using at least a portion of the candidate codebook tuple to update an existing codebook tuple. Briefly, the method determines whether a candidate codebook tuple includes all of the same formants as an existing codebook tuple, and whether the respective amplitudes of the formants of the candidate codebook tuple are within a threshold range relative to the amplitudes of the formants of the existing codebook tuple.

The method includes generating a candidate codebook tuple (501), as discussed above. The method then includes selecting an existing codebook tuple to evaluate the candidate codebook tuple (502). In some implementations, more popular existing codebook tuples are selected before less popular codebook tuples. However, those skilled in the art will appreciate that there are many ways of selecting an existing codebook tuple from a codebook. For the sake of brevity, an exhaustive listing of all such methods of selecting is not provided herein.

Using the selected existing codebook tuple, the method includes determining whether the candidate codebook tuple includes all of the same formants as the existing codebook tuple (503). In some implementations, this is accomplished by comparing the respective formant spectrum values of each. In some implementations, precise matching is preferred because during the generation of the codebook voice samples with high intelligibility are preferably used. In turn, the resulting codebook will include relatively accurate codebook tuples that are substantially uncorrupted by noise and other interference.

If the formants do no match ("No" path from 503), the method include determining whether there are additional existing codebook tuples in the codebook (504). If there are no additional codebook tuples in the codebook ("No" path from 504), the method includes adding the candidate codebook tuple to the codebook because it is new relative to the existing codebook (509). However, if there are additional codebook tuples ("Yes" path from 504), the method includes selecting a previously unselected existing codebook tuple to continue the evaluation process.

On the other hand, if the formants match ("Yes" path from 503), the method includes selecting a corresponding pair of formants from the candidate codebook tuple and the existing codebook tuple for more detailed evaluation (505). To that end, the method includes determining whether the selected formant from the candidate codebook tuple has a respective amplitude that is within a threshold range of the corresponding selected formant from the existing codebook tuple. In some implementations, the threshold range is 10 dB, although those skilled in the art will recognize that various other ranges utilized instead.

If the amplitudes match within the threshold range ("Yes" path from 506), the method includes determining whether all the formant pairs have been considered (507). If all the formant pairs have been considered ("Yes" path from 507), the candidate codebook tuple is considered a match to the existing codebook tuple, and the method includes adjusting the existing codebook tuple as discussed above (508). However, if there is at least one formant pair left to consider ("No" path from 507), the method includes selecting another formant pair.

On the other hand, if the amplitudes of the selected formants do not match with the threshold range ("No" path from 506), the method includes adding the candidate codebook tuple to the codebook because it is new relative to the existing codebook (509).

Figure 6:
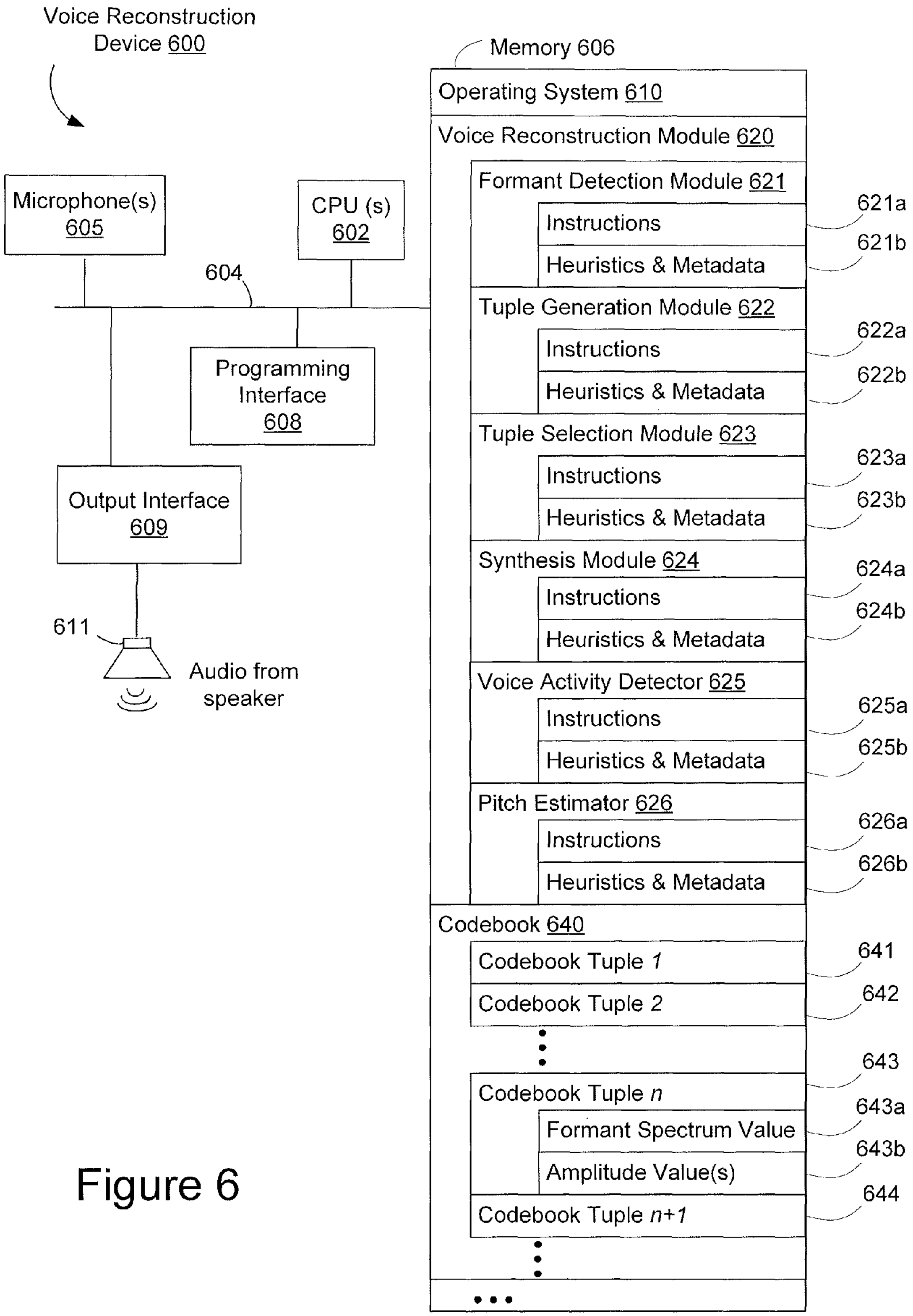
FIG. 6 is a block diagram of an example implementation of a voice signal reconstruction system.

FIG. 6 is a block diagram of an example implementation of a voice signal reconstruction system 600. The voice signal reconstruction system 600 may be implemented in a variety of devices includes, but not limited to, hearing aids, mobile phones, telephone headsets, short-range radio headsets, voice encoders, ear muffs that let voice through, and the like. Moreover, while certain specific features are illustrated, those skilled in the art will appreciate from the present disclosure that various other features have not been illustrated for the sake of brevity and so as not to obscure more pertinent aspects of the example implementations disclosed herein. To that end, as a non-limiting example, in some implementations the voice signal reconstruction system 600 includes one or more processing units (CPU's) 602, one or more programming interfaces 608, a memory 606, a microphone 605, and output interface 609, a speaker 611, and one or more communication buses 604 for interconnecting these and various other components.

The communication buses 604 may include circuitry that interconnects and controls communications between system components. The memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 606 may optionally include one or more storage devices remotely located from the CPU(s) 602. The memory 606, including the non-volatile and volatile memory device (s) within the memory 606, comprises a non-transitory computer readable storage medium. In some implementations, the memory 606 or the non-transitory computer readable storage medium of the memory 606 stores the following programs, modules and data structures, or a subset thereof including an operating system 610, a voice reconstruction module 620, and a formant based codebook 640.

The operating system 610 includes procedures for handling various basic system services and for performing hardware dependent tasks. In a hearing aid implementation, the operating system 610 is optional, as in some hearing aid implementations, the device is primarily implemented using a combination of standalone firmware and hardware in order to reduce processing overhead.

In some implementations, the formant based codebook 640 stores codebook tuples that have been received through the programming interface 608. For example, schematic representations of codebook tuples 641, 642, 643 and 644 are included in FIG. 6 within the formant based codebook 640. As discussed above, in some implementations, as shown for example with reference to codebook tuple 643, each codebook tuple includes a formant spectrum **643*a* value and one or more formant amplitude values 643*b***. In some implementations, the formant spectrum value is indicative of the spectral location of each of the one or more formants characterizing a particular codebook tuple. Similarly, in some implementations, the one or more formant amplitude values are indicative of the corresponding amplitudes or acceptable amplitude ranges of the one or more formants characterizing a particular codebook tuple. In some implementations, the spectrum associated with human speech characterized by a number of sub-bands, and a particular formant spectrum value indicates which of the sub-bands includes the one or more formants for a respective codebook tuple. In some implementations, the formant spectrum value includes a binary pattern representing the aforementioned sub-band information. In some implementation, the formant spectrum value includes an encoded value representing the same.

In some implementations, the voice reconstruction module module 620 includes a formant detection module 621, a tuple generation module 622, a tuple selection module 623, a synthesis module 624, a voice activity detector 625 and a pitch estimator 626. In some implementations, the voice reconstruction module module 620 is operable to reconstruct a target voice signal using associated formants detected in an audible signal received by the microphone 605, the formant based codebook 640, and a pitch estimate.

To that end, in some implementations the formant detection module 621 is configured to detect formants within an audible signal received by the microphone 605 and provide an output indicative of where in the spectrum the detected formants are located, along with the amplitude for each detected formant. In some implementations, the formant detection module 621 is configured to convert the received audible signal into a number of time-frequency units, such that the time dimension of each time-frequency unit includes at least one of a plurality of sequential intervals, and wherein the frequency dimension of each time-frequency unit includes at least one of a plurality of sub-bands contiguously distributed throughout the frequency spectrum associated with human speech. The conversion may be accomplished using a Fast Fourier Transform (FFT) centered on each sub-band. In order to accomplish these ends, in some implementations, the formant detection module 621 includes a set of instructions 621*a* and heuristics and metadata 621*b*.

In some implementations, the tuple generation module 622 is configured to generate a detected codebook tuple from the outputs received from the formant detection module 621. In some implementations, a detected codebook tuple has the same or similar structure to that of the existing codebook tuples. That is, a detected codebook tuple may include a formant spectrum value and one or more formant amplitude values, wherein the formant spectrum value is indicative of the spectral location of each of the one or more detected formants, and the one or more formant amplitude values are indicative of the corresponding amplitudes of the one or more detected formants. In order to accomplish these ends, in some implementations, the tuple generation module 622 includes a set of instructions 622*a* and heuristics and metadata 622*b*.

In some implementations, the tuple selection module 623 is configured to select an existing codebook tuple from the formant based codebook 640 for each detected codebook tuple generated by the tuple generation module 622. To that end, in some implementations, the tuple selection module 623 includes a set of instructions 623*a* and heuristics and metadata 623*b*. Implementations of the processes involved with evaluating a candidate tuple are discussed in greater detail below with reference to FIGS. 8 and 9.

In some implementations, the synthesis module 624 is configured to reconstruct a target voice signal using the formant information in the selected codebook tuples, not the detected formants, in combination with a pitch estimate received from the pitch estimator 626. In some implementations, in order to improve the sound quality of the reconstructed target voice signal the reconstructed target voice signal is resynthesized one glottal pulse at a time through an Inverse Fast Fourier Transform (IFFT) of the interpolated spectrum centered on each glottal pulse, while adjusting the phase between sequential glottal pulses so that the phase remains with an acceptable range. To that end, in some implementations, the synthesis module 624 includes a set of instructions 624*a* and heuristics and metadata 624*b*.

In some implementations, the voice activity detector 625 is configured to determine when the audible signal received by the microphone includes voice activity, and to initiate the other functions performed by the voice reconstruction module 620. To that end, in some implementations, the voice activity detector 625 includes a set of instructions 625*a* and heuristics and metadata 625*b*.

In some implementations, the pitch estimator 626 is configured to estimate the pitch of a target voice signal. To that end, in some implementations, the pitch estimator 626 includes a set of instructions 626*a* and heuristics and metadata 626*b*. As discussed above, the duration of one glottal pulse is representative of the duration one opening and closing cycle of the glottis, and the fundamental frequency of the glottal pulse train is the inverse of the duration of a single glottal pulse. The fundamental frequency of a glottal pulse train dominates the perception of the pitch of a voice (i.e., how high or low a voice sounds). As such, in some implementations, an estimate of the fundamental frequency of the target voice signal in the audible signal is used as a quantitative proxy for the pitch estimate, which is traditionally a perceptual characteristics of a voice signal.

Moreover, FIG. 6 is intended more as functional description of the various features which may be present in a particular implementation as opposed to a structural schematic of the implementations described herein. In practice, and as recognized by those of ordinary skill in the art, items shown separately could be combined and some items could be separated. For example, some modules (e.g., formant detection module 621 and the tuple generation module 622) shown separately in FIG. 6 could be implemented in a single module and the various functions of single modules could be implemented by one or more modules in various implementations. The actual number of modules and the division of particular functions used to implement the voice signal reconstruction system 600 and how features are allocated among them will vary from one implementation to another, and may depend in part on the particular combination of hardware, software and/or firmware chosen for a particular implementation.

Figure 7:
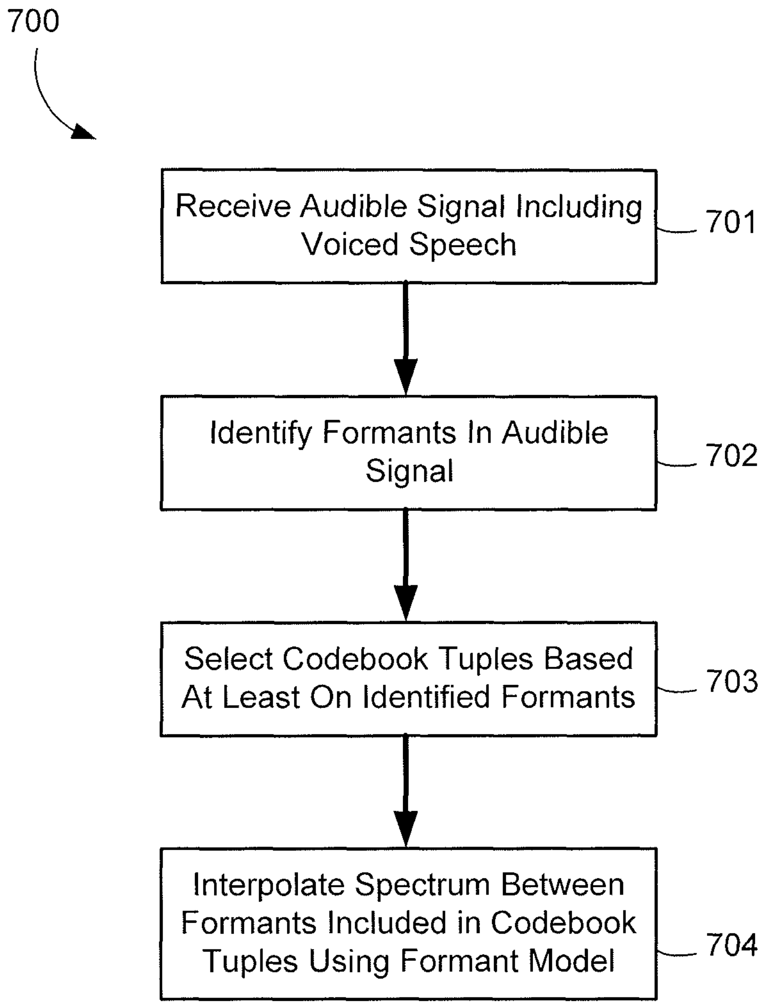
FIG. 7 is a flowchart representation of an implementation of a voice signal reconstruction system method.

FIG. 7 is a flowchart 700 representation of an implementation of a voice signal reconstruction system method. In some implementations, the method is performed by a hearing aid or the like in order to reconstruct a target voice signal identified in an audible signal. Briefly, the method analyzes the received audible signal to detect formants associated with the target voice signal, and uses those formants to select codebook tuples that are used to reconstruct the target voice signal from the formant information included in the codebook tuples and a pitch estimate.

To that end, the method includes receiving an audible signal (701). In some implementations, analysis of the received audible signal includes detecting and characterizing the formants included in the received audible signal (702). To that end, detected formants are characterized by an amplitude (or energy level) and where in the spectrum the detected formants are located. In some implementations the detected formants may be further characterized by at least one of a corresponding center frequency, a frequency offset and a bandwidth. In some implementations, the analysis includes converting the received audible signal into a number of time-frequency units, such that the time dimension of each time-frequency unit includes at least one of a plurality of sequential intervals, and the frequency dimension of each time-frequency unit includes at least one of a plurality of sub-bands contiguously distributed throughout the frequency spectrum associated with human speech.

The method then includes selecting codebook tuples using the detected formants (703). In some implementations, selecting codebook tuples includes generating a detected tuple from the detected formants, and evaluating the generated detected tuple at least with respect to the codebook tuples. A more detailed example of an implementation of an evaluation process is described below with reference to the flowchart illustrated in FIG. 9. Using the selected codebook tuples, the method includes interpolating the spectrum between the corresponding one or more formants associated with the one or more selected codebook tuples to generate a reconstructed speech signal using a pitch estimate of the target voice signal (704). In some implementations, in order to improve the sound quality of the reconstructed target voice signal the reconstructed target voice signal is resynthesized one glottal pulse at a time through an Inverse Fast Fourier Transform (IFFT) of the interpolated spectrum centered on each glottal pulse, while adjusting the phase between sequential glottal pulses so that the phase remains with an acceptable range.

Figure 8:
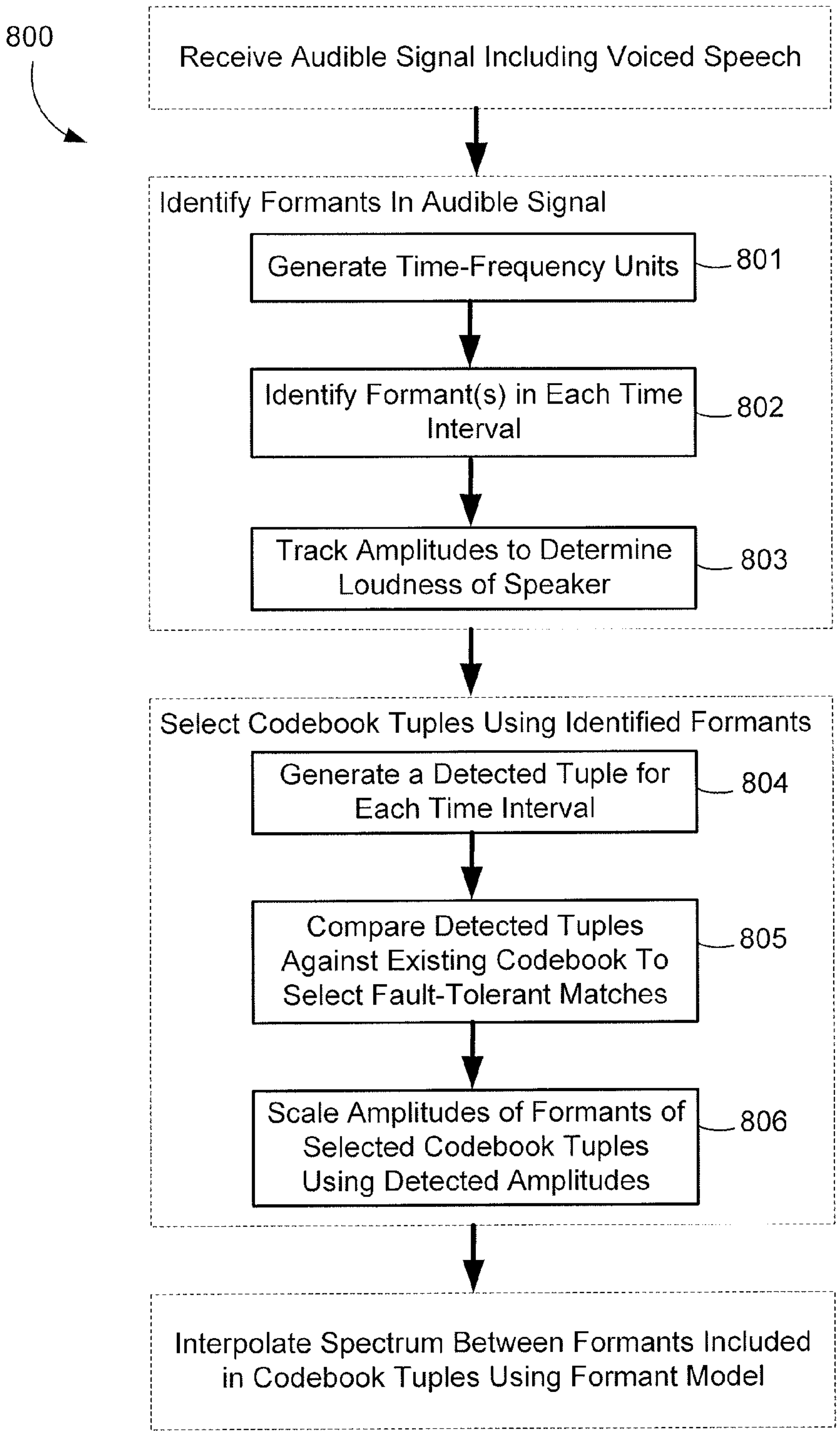
FIG. 8 is a flowchart representation of an implementation of a voice signal reconstruction system method.

FIG. 8 is a flowchart 800 representation of an implementation of a voice signal reconstruction system method. In some implementations, the method is performed by a hearing aid or the like in order to reconstruct a target voice signal identified in an audible signal. Briefly, the method analyzes the received audible signal to detect formants associated with the target voice signal, and uses those formants to select codebook tuples that are used to reconstruct the target voice signal from the formant information included in the codebook tuples and a pitch estimate.

To that end, the method includes generating a number of time-frequency units from the received audible signal (801). In some implementations, the time dimension of each time-frequency unit includes at least one of a plurality of sequential intervals, and the frequency dimension of each time-frequency unit includes at least one of a plurality of sub-bands contiguously distributed throughout the frequency spectrum associated with human speech. For example, with further reference to FIG. 1, in the frequency domain, the 4 kHz band including the human voice spectrum 101 may be divided into a number of 500 Hz sub-bands, as shown for example by sub-band 105. In the time domain, each interval may be 40 milliseconds in one implementation, and 100 milliseconds in another implementation. While specific examples are highlighted above, for both the time and frequency dimensions of the time-frequency units, those skilled in the art will appreciate that the sub-bands in the frequency domain and the intervals in the time domain can be defined using any number of specific values and combinations of those values. As such, the specific examples discussed above are not meant to be limiting.

Returning to FIG. 8, the method includes analyzing the time-frequency units to identify formants in each time interval (802). To that end, detected formants are characterized by an amplitude (or energy level) and where in the spectrum the detected formants are located. In some implementations the detected formants may be further characterized by at least one of a corresponding center frequency, a frequency offset and a bandwidth. The method also includes tracking the amplitude of detected formants across sequential time intervals to determine the loudness the target voice signal (803). Using the frequency characteristics of the detected formants, the method may also include generating a formant spectrum value for each time interval, which is included in the detected tuple for a particular time interval (804).

In some implementations, the formant spectrum value includes a binary pattern representing the aforementioned sub-band information. In other words, one formant spectrum value is used to represent the presence of multiple formants in multiple corresponding sub-bands. Additionally and/or alternatively, in some implementations, more than one formant spectrum value is generated for each detected tuple, such that each formant spectrum value is indicated of one or more of the detected formants for that interval. Additionally and/or alternatively, a formant spectrum value includes an encoded value representing the aforementioned sub-band information. The encode value may be a hash value generated by combining the frequency domain characterizations of the detected formants.

The method includes comparing the detected tuples against the existing codebook tuples to select fault-tolerant matches (805). As noted above, a more detailed example of an implementation of an evaluation process is described below with reference to the flowchart illustrated in FIG. 9. The method includes scaling respective associated amplitudes of the selected codebook tuples using the detected amplitudes so that the reconstructed target voice signal matches the amplitude of the target voice signal detected in the received audible signal when the formant information is interpolated (806).

Figure 9:
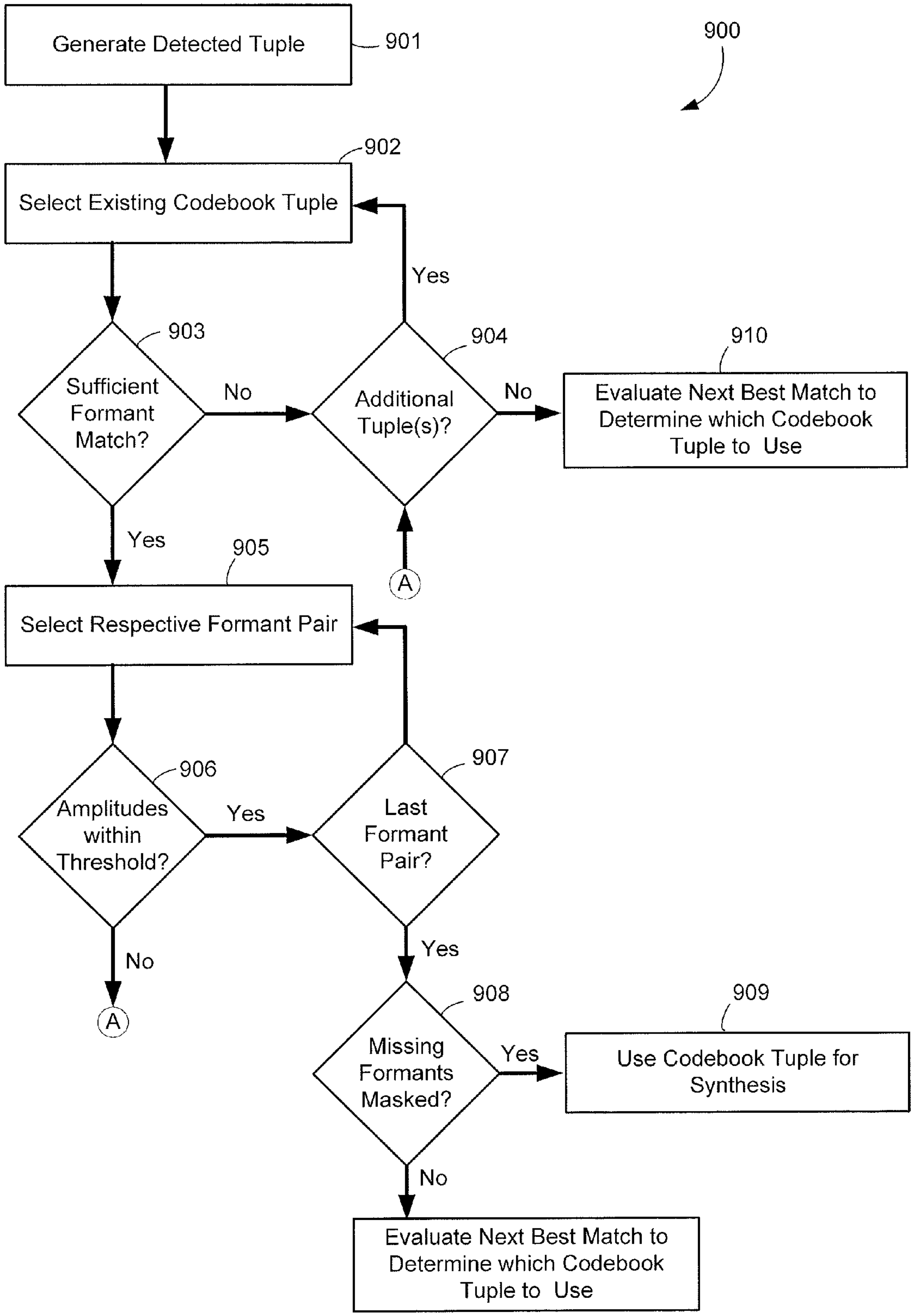
FIG. 9 is a flowchart representation of an implementation of a voice signal reconstruction system method.

FIG. 9 is a flowchart 900 representation of an implementation of a voice signal reconstruction system method. In some implementations, the method is performed by a hearing aid or the like in order to reconstruct a target voice signal identified in an audible signal. Briefly, the method identifies codebook tuples using the formant information detected in the received audible signal in order to reconstruct the target voice signal. Unlike the codebook generation process described above with reference to FIG. 5, the process described with reference to FIG. 9 is typically expected to be relatively more fault-tolerant because, in operation, the received audible signal will typically be noisy.

The method includes generating a detected tuple (901), as discussed above. The method then includes selecting an existing codebook tuple to evaluate the detected tuple (902). In some implementations, more popular existing codebook tuples are selected before less popular codebook tuples. However, those skilled in the art will appreciate that there are many ways of selecting an existing codebook tuple from a codebook. For the sake of brevity, an exhaustive listing of all such methods of selecting is not provided herein.

Using the selected existing codebook tuple, the method includes determining whether the detected tuple includes a threshold number of the same formants as the existing codebook tuple (903). In some implementations, this is accomplished by comparing the respective formant spectrum values of each. In some implementations, fault-tolerant matching is preferred because the received audible signal is presumed to be noisy, which results in fault prone generation of the detected tuples.

If the formants do no match to sufficient degree ("No" path from 903), the method include determining whether there are additional existing codebook tuples in the codebook (904). If there are no additional codebook tuples in the codebook ("No" path from 904), the method includes evaluating the next best match to determine which codebook tuple to use (909). In some implementations, this is accomplished by relaxing the thresholds used to compare the detected tuple to the existing codebook tuples. However, if there are additional codebook tuples ("Yes" path from 904), the method includes selecting a previously unselected existing codebook tuple to continue the evaluation process.

On the other hand, if the formants match ("Yes" path from 903), the method includes selecting a corresponding pair of formants from the detected tuple and the existing codebook tuple for more detailed evaluation (905). To that end, the method includes determining whether the selected formant from the detected tuple has a respective amplitude that is within a threshold range of the corresponding selected formant from the existing codebook tuple. In some implementations, the threshold range is 10 dB, although those skilled in the art will recognize that various other ranges utilized instead.

If the amplitudes match within the threshold range ("Yes" path from 906), the method includes determining whether all the formant pairs that are available have been considered (907). If the amplitudes of the selected formants do not match with the threshold range ("No" path from 906), the method includes evaluating the next best match to determine which codebook tuple to use (909), as discussed above.

On the other hand, if all the formant pairs have been considered ("Yes" path from 907), the detected tuple is considered a match to the existing codebook tuple, and the method includes determining if formants in the existing codebook tuple that are not present in the detected tuple were likely to have been masked by noise or interference (908). If so ("Yes" path from 908), the method includes confirming the use of the selected codebook tuple. If not ("Yes" path from 908), the method includes evaluating the next best match to determine which codebook tuple to use (909), as discussed above.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method of reconstructing a speech signal from an audible signal using a formant-based codebook, the method comprising:

detecting one or more formants in an audible signal;

receiving a pitch estimate associated with the one or more detected formants;

selecting one or more codebook tuples from the formant-based codebook based at least on the one or more detected formants, wherein each codebook tuple includes a respective formant spectrum value and a respective one or more formant amplitude values, wherein the respective formant spectrum value is indicative of the spectral location of one or more formants associated with the codebook tuple, and the respective one or more formant amplitude values are indicative of the corresponding amplitudes of the one or more formants associated with the codebook tuple; and interpolating the spectrum between the corresponding one or more formants associated with the one or more selected codebook tuples to generate a reconstructed speech signal using the received pitch estimate.

2. The method of claim 1, wherein the audible signal is noisy.

3. The method of claim 1, further comprising receiving the audible signal from a single audio sensor device.

4. The method of claim 1, further comprising receiving the audible signal from a plurality of audio sensors.

5. The method of claim 1, wherein detecting one or more formants in the audible signal comprises:

converting the audible signal into a corresponding plurality of time-frequency units, wherein the time dimension of each time-frequency unit includes at least one of a plurality of sequential intervals spanning the duration of the audible signal, and wherein the frequency dimension of each time-frequency unit includes at least one of a plurality of sub-bands; and generating a respective detected tuple from the plurality of time-frequency units for each time interval, wherein the detected tuple includes a respective formant spectrum value and a respective one or more formant amplitude values, wherein the respective formant spectrum value is indicative of the spectral location of each of the one or more detected formants in the corresponding time interval, and the respective one or more formant amplitude values are indicative of the corresponding amplitudes of the one or more detected formants in the corresponding time interval.

6. The method of claim 5, wherein the plurality of sub-bands is contiguously distributed throughout the frequency spectrum associated with human speech.

7. The method of claim 6, wherein the spectral location of a particular formant is further characterized by at least one of a corresponding center frequency, a frequency offset and a bandwidth.

8. The method of claim 6, wherein the spectrum associated with human speech includes a plurality of sub-bands, and wherein the formant spectrum value indicates which of the plurality of sub-bands includes the one or more detected formants detected.

9. The method of claim 8, wherein formant spectrum value comprises a binary pattern.

10. The method of claim 8, wherein the formant spectrum value comprises an encoded value.

11. The method of claim 5, wherein selecting one or more codebook tuples from the formant-based codebook comprises:

identifying a respective codebook tuple that matches the respective detected tuple for each time interval by comparing the formant spectrum value of the respective detected tuple to the respective formant spectrum value of one or more codebook tuples.

12. The method of claim 11, wherein the comparison of the formant spectrum value of the respective detected tuple to the respective formant spectrum value of one or more codebook tuples is fault tolerant.

13. The method of claim 12, wherein the matching codebook tuple has a greater number of formants than the detected tuple.

14. The method of claim 12, wherein the matching codebook tuple includes a respective formant at each spectral location in which the detected tuple has a respective formant.

15. The method of claim 11, wherein selecting one or more codebook tuples from the formant-based codebook further comprises:

comparing the one or more formant amplitude values of the detected tuple to the corresponding one or more formant amplitudes values of the respective matching codebook tuple to determine whether the match should be accepted or rejected.

16. The method of claim 5, wherein the match is rejected is one or more of the one or more formant amplitude values do not match the corresponding one or more formant amplitudes of the matched codebook tuple within a respective threshold.

17. The method of claim 16, wherein the respective threshold is 10 dB.

18. The method of claim 5, wherein in response to accepting the match, the method further comprises:

determining an indicator of whether any of the respective formants in the matched codebook tuple that are not present in the respective detected tuple for each time interval are likely to have been masked by noise in the audible signal;

determining whether the indicator satisfies a threshold; and accepting the matched codebook tuple to reconstruct the speech signal for the corresponding time interval in response to determining that the indicator satisfies the threshold.

19. The method of claim 18, wherein the threshold is 10 dB.

20. The method of claim 1, further comprising:

tracking the amplitude of the audible signal; and normalizing the respective formant amplitude values of the corresponding one or more selected codebook tuples based at least on the tracked amplitude of the audible signal.

21. The method of claim 1, wherein the interpolation of the spectrum between the corresponding one or more formants associated with the one or more selected codebook tuples comprises synthesizing one or more voice sections one glottal pulse at a time using an Inverse Fast Fourier Transform centered at each glottal pulse.

22. The method of claim 1, wherein the interpolation of the spectrum between the corresponding one or more formants associated with the one or more selected codebook tuples comprises using a Lorentz function.

23. A voice reconstruction device operable to reconstruct a speech signal from an audible signal using a formant based codebook, the device comprising:

a formant detection module configured to detect one or more formants in an audible signal;

a tuple selection module configured to select one or more codebook tuples from the formant-based codebook based at least on the one or more detected formants, wherein each codebook tuple includes a respective formant spectrum value and a respective one or more formant amplitude values, wherein the respective formant spectrum value is indicative of the spectral location of one or more formants associated with the codebook tuple, and the respective one or more formant amplitude values are indicative of the corresponding amplitudes of the one or more formants associated with the codebook tuple; and a synthesis module configured to interpolate the spectrum between the corresponding one or more formants associated with the one or more selected codebook tuples to generate a reconstructed speech signal using a pitch estimate.

24. A voice reconstruction device operable to reconstruct a speech signal from an audible signal using a formant based codebook, the device comprising:

means for detecting one or more formants in an audible signal;

means for selecting one or more codebook tuples from the formant-based codebook based at least on the one or more detected formants, wherein each codebook tuple includes a respective formant spectrum value and a respective one or more formant amplitude values, wherein the respective formant spectrum value is indicative of the spectral location of one or more formants associated with the codebook tuple, and the respective one or more formant amplitude values are indicative of the corresponding amplitudes of the one or more formants associated with the codebook tuple; and means for interpolating the spectrum between the corresponding one or more formants associated with the one or more selected codebook tuples to generate a reconstructed speech signal using a pitch estimate.

25. A voice reconstruction device operable to reconstruct a speech signal from an audible signal using a formant based codebook, the device comprising:

a processor; and a memory including instructions, that when executed by the processor cause the device to:

detect one or more formants in an audible signal;

select one or more codebook tuples from the formant-based codebook based at least on the one or more detected formants, wherein each codebook tuple includes a respective formant spectrum value and a respective one or more formant amplitude values, wherein the respective formant spectrum value is indicative of the spectral location of one or more formants associated with the codebook tuple, and the respective one or more formant amplitude values are indicative of the corresponding amplitudes of the one or more formants associated with the codebook tuple; and interpolate the spectrum between the corresponding one or more formants associated with the one or more selected codebook tuples to generate a reconstructed speech signal using a pitch estimate.

* * * * *